US009479977B2

(12) United States Patent
Hedberg et al.

(10) Patent No.: US 9,479,977 B2
(45) Date of Patent: Oct. 25, 2016

(54) METHOD AND DEVICE FOR PERFORMING AN ACCESS REQUEST BY A USER EQUIPMENT

(75) Inventors: Tomas Hedberg, Stockholm (SE); Lars Lindbom, Karlstad (SE); Tomas Nylander, Värmdö (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 131 days.

(21) Appl. No.: 14/125,233
(22) PCT Filed: Nov. 10, 2011
(86) PCT No.: PCT/IB2011/055034
  § 371 (c)(1),
  (2), (4) Date: Jan. 23, 2014
(87) PCT Pub. No.: WO2012/172397
  PCT Pub. Date: Dec. 20, 2012

(65) Prior Publication Data
US 2014/0135018 A1 May 15, 2014

Related U.S. Application Data
(60) Provisional application No. 61/498,195, filed on Jun. 17, 2011.

(51) Int. Cl.
  H04W 36/00 (2009.01)
  H04W 48/20 (2009.01)
  H04W 52/02 (2009.01)
  H04W 28/06 (2009.01)
  H04W 28/18 (2009.01)
  (Continued)

(52) U.S. Cl.
  CPC ......... *H04W 36/0077* (2013.01); *H04W 48/20* (2013.01); *H04W 52/0229* (2013.01);
  (Continued)

(58) Field of Classification Search
  CPC ............... H04W 36/30; H04W 48/16; H04W 36/0083; H04W 48/20; H04W 36/08; H04W 36/14; H04W 24/02; H04W 60/04; H04W 36/0022; H04W 48/10; H04W 60/00; H04W 36/0005; H04W 36/165; H04W 36/24; H04W 40/246; H04W 48/18; H04W 28/08; H04W 36/06; H04W 36/16; H04W 36/18; H04W 36/22; H04W 36/0077
  USPC ....... 455/436–444, 432.1, 434, 435.1, 435.2; 370/331, 229–230
  See application file for complete search history.

(56) References Cited

U.S. PATENT DOCUMENTS

| 2008/0101313 | A1* | 5/2008 | Choi ................... | H04W 72/06 370/342 |
| 2009/0005095 | A1* | 1/2009 | Chun ................... | H04W 72/005 455/509 |

(Continued)

FOREIGN PATENT DOCUMENTS

WO  WO 2010/030935 A2  3/2010

*Primary Examiner* — Magdi Elhag

(57) ABSTRACT

A method, User Equipment (UE), and first base station serving a first cell for performing an access request by the UE for operatively connecting the UE to a second cell. The UE obtains radio quality parameters indicating quality of radio reception between the UE and the first and second cells. Based on the obtained radio quality parameters, it is determined whether the UE is in a link imbalance zone where the UE has an option to be connected to both the first cell and the second cell. If so, the UE sends access request information, to the first base station and indicates availability of the UE to be redirected to the second cell. The first base station may redirect the UE to the second cell when a load of the first cell meets pre-defined load criteria.

9 Claims, 5 Drawing Sheets

(51) Int. Cl.
  *H04W 36/30* (2009.01)
  *H04W 72/12* (2009.01)
  *H04W 74/00* (2009.01)
  *H04W 84/04* (2009.01)
(52) U.S. Cl.
  CPC ........... *H04W 28/06* (2013.01); *H04W 28/18* (2013.01); *H04W 36/30* (2013.01); *H04W 72/12* (2013.01); *H04W 74/004* (2013.01); *H04W 74/006* (2013.01); *H04W 84/045* (2013.01)

(56) References Cited

U.S. PATENT DOCUMENTS

| | | | |
|---|---|---|---|
| 2009/0016278 A1* | 1/2009 | Wakabayashi | H04W 72/08 370/329 |
| 2010/0008282 A1 | 1/2010 | Bhattad et al. | |
| 2010/0067470 A1* | 3/2010 | Damnjanovic | H04L 5/0053 370/329 |
| 2010/0091651 A1 | 4/2010 | Chin et al. | |
| 2010/0216466 A1 | 8/2010 | Chin et al. | |
| 2011/0207459 A1* | 8/2011 | Ramasamy | H04W 36/0061 455/436 |
| 2011/0249635 A1* | 10/2011 | Chen | H04W 74/002 370/329 |
| 2012/0100851 A1* | 4/2012 | Zheng | H04W 36/0094 455/436 |
| 2013/0010716 A1* | 1/2013 | Dinan | H04W 76/025 370/329 |
| 2014/0112254 A1* | 4/2014 | Lindoff | H04W 74/002 370/328 |
| 2015/0195763 A1* | 7/2015 | Chen | H04W 36/30 455/436 |

* cited by examiner

METHOD AND DEVICE FOR PERFORMING AN ACCESS REQUEST BY A USER EQUIPMENT

This application claims the benefit of U.S. Provisional Application No. 61/498,195, filed Jun. 17, 2011, the disclosure of which is fully incorporated herein by reference.

TECHNICAL FIELD

The present invention generally relates to wireless communication systems. In particular, and without limitation, the present invention is directed to a method and device for redirecting mobile terminals (e.g., User Equipments) located within link imbalance zones to neighbor cells before connection establishment is completed.

BACKGROUND

The following abbreviations are used in this disclosure:
eNB Evolved Node B
ICIC Inter-Cell Interference Coordination
LTE Long Term Evolution
NAS Non-Access Stratum
PCI Physical Cell Identity
RA Random Access
RACH Random Access Channel
RAN Radio Access Network
RAT Radio Access Technology
RRC Radio Resource Control
RSRP Reference Signal Received Power
RSRQ Reference Signal Received Quality
UE User Equipment
UTRAN UMTS Terrestrial Radio Access Network
WCDMA Wideband Code Division Multiple Access FIG. 1 discloses one example of a heterogeneous network 100 network suitable for use with the present invention. Improved support for heterogeneous network operations is part of the ongoing enhancements of the LTE specification of 3GPP. Heterogeneous networks may be characterized as deployments with a mixture of cells of differently sized and overlapping coverage areas. In the heterogeneous network 100, are deployed a first pico base station 122 covering a first picocell 120, a second pico base station 132 covering a second picocell 130, and a third pico base station 142 covering a third picocell 140. The picocells are deployed within a macro cell 110 of a macro base station 116 having a first antenna 112 and a second antenna 114, which may service the same or different macro cells.

A pico base station like the first pico base station 122 is a small cellular base station transmitting with low output power and typically covers a much smaller geographical area than a macro base station. A small cellular base station may be referred to as a low power node, whereas a macro base station represents a high power node. Other examples of low power nodes in heterogeneous networks are home base stations and relays.

Heterogeneous networks represent an alternative to densification of macro networks, and have classically been considered in cellular networks with traffic hotspots such as geographical areas of clustered user distributions. There, small cells covering the traffic hotspot off-load the macro cell and thus improve both capacity and the overall data throughput within the coverage area of the macro cell. In emerging mobile broadband applications, there is however a continuous demand for higher data rates and therefore it is of interest to deploy low power nodes not necessarily to cover traffic hotspots only but also at locations within the macro cell coverage where the signal-to-noise ratio prevents high data rates.

User Equipments or UEs such as, for example, cellular telephones attached to cellular networks continuously monitor which cell they should be associated with. This monitoring is typically conducted by evaluating the radio reception quality of its serving cell (current association) against radio reception quality of neighbor cells. If the radio reception quality of a neighbor cell is better than the serving cell, a new cell association is established for the user equipment.

In LTE networks, the procedures for changing cell association depend on which of the two RRC states, RRC_IDLE and RRC_CONNECTED, the UE is within. In connected mode the UE is known by the radio access network (RAN) and cell association decisions are taken by the RAN, usually based on mobility measurement reports provided by the UE. If such a report indicates that the UE is better served by a neighbor cell, then the network initiates a handover procedure.

In idle mode, the UE cannot report measurements to the network so an autonomous cell reselection procedure is used. However, the network controls the cell reselection procedure in the sense that it broadcasts cell-specific system information that UEs shall take into account when selecting a cell to camp on. Examples of system information broadcast by the network are idle mobility parameters such as thresholds (S(Non)IntraSearch in serving cell to enable measurements. q-QualMin, ThreshX,High for target cells, Thresh-Serving, Low for serving cell), offsets (Qoffset for carrier frequency or for individual cells) and priority lists of frequencies.

In LTE, a user may be assigned UE-specific idle mobility priorities when changing RRC state from connected to idle state. Note that priority-based cell reselection is only used between different RATs and between different carriers. One secondary objective of the priority-based selection is to minimize UE battery consumption, by reducing inter-frequency and inter-RAT measurements. Measurement quantities typically used for mobility purposes are Reference Signal Received Power (RSRP) and Reference Signal Received Quality (RSRQ).

Depending on how these mobility measurements, possibly complemented by a configurable offset (handover bias or cell reselection offset), are used a UE may be connected/camped to the cell with the strongest received power, or the cell with the best path gain, or a combination of the two.

These different cell association principles do not always result in the same selected cell as the base station output powers of cells of different type are different. This is sometimes referred to as link imbalance. For example, the output power of a small base station or a relay is in the order of 30 dBm or less, while a macro base station may have an output power of 46 dBm. Consequently, even in the proximity of the picocell, the downlink signal strength from the macro cell may be larger than that of the picocell.

FIG. 2 discloses the macro base station 116 serving the first macro cell 110 and the third picocell 140. Typically, from a downlink perspective, it is better to select a cell based on downlink received power, whereas from an uplink perspective, it is better to select the cell based on the path loss. FIG. 2 further discloses the received or receivable power $P_M$ of the macro cell and the path loss $L_M$ of the first macro cell as a function of distance from the first macro base station 116. Likewise, the received or receivable power $P_P$ of the third picocell and the path loss $L_P$ of the third picocell as a function of distance from the third pico base station 142 are indicated in FIG. 2.

A first dotted line 202 indicates a pathloss border (or RSRP or +offset border) where the path loss $L_M$ of the first macro cell 110 is substantially equal to the path loss $L_P$ of the third picocell 140. A second dotted line 204 indicates an RSRP border where the received power $P_M$ of the first macro cell is substantially equal to the received power $P_P$ of the third picocell. The area between the pathloss border and the RSRP border is referred to as a link imbalance zone 148. Although in FIG. 2 the link imbalance zone 148 is drawn in a circular fashion, a person skilled in the art will understand that in practice, the link imbalance zone may not always have a circular shape. The reason for this is that on the right side of the third picocell 140 covered by the third pico base station 142, the pathloss border and the RSRP border may be further away from the third pico base station.

In this scenario, it may be more beneficial from the system perspective for the UE to connect to the third picocell 142 even if the macro downlink is much stronger than the picocell downlink. Increasing the coverage of small cells for operations in link imbalance zones may be done, e.g., by adding an offset or a bias to the RSRP measurements. Operations with larger offsets/biases would require Inter-Cell Interference Coordination (ICIC) across layers.

3GPP has in LTE release 10 specified new ICIC features for enabling reliable operations in link imbalance zones of UEs in the connected mode. One way of providing ICIC in 3GPP LTE release 10 is illustrated in FIG. 3.

FIG. 3 discloses a macro cell communication channel 302 and a picocell communication channel 304. Both communication channels are divided into frames, preferably with a duration of 1 millisecond.

In this case, an interfering macro cell avoids scheduling unicast traffic in certain subframes in order to create protected subframes for the picocell. The macro eNB like the macro cbase station 116 indicates via a backhaul X2 interface 150 (FIG. 1) to a neighbor pico eNB such as the third pico base station 142, which protected macro cell subframes 312 it intends to not schedule transmissions within. The pico eNB may then take this information into account when scheduling the UEs operating within the link imbalance zone; such that these UEs are prioritized to be scheduled in the protected picocell subframes 314, i.e., low interference subframes. UEs operating very close to the pico eNB may, in principle, be scheduled in all subframes.

When an idle mode UE is to connect to a cell, it is desirable that the UE stays in the connected cell for a while after transitioning to the connected state and not almost immediately trigger a handover situation. As may be observed from FIG. 2, an idle mode UE located in the link imbalance zone 148 would camp on the first macro cell 110 if the cell reselection criterion is based on the strongest received downlink signal. When such UE connects to the first macro cell, the macro base station 116 may directly hand over the UE to the third pico base station 142 if the UE is capable of operating in the link imbalance zone 148. To avoid such immediate handovers, the cell size seen by UEs capable of operating in link imbalance zones should preferably be similar in both the RRC states. One way to achieve this is to align handover biases with threshold offsets used for cell reselection.

Legacy UEs cannot be associated with picocells when they are located in link imbalance zones resulting in very low geometries. The same holds also for non-legacy UEs that do not support the new ICIC features of LTE release 10.

This implies that handover biases as well as cell reselection offsets will depend on the capability of the UEs. Although a UE may be capable of being associated with a picocell when located within the link imbalance zone, it may be better from a system perspective to let such UEs camp on the macro cell if the picocell is highly loaded.

An LTE network may control traffic loads across cells in heterogeneous deployments by adjusting the density of protected resources for operations in link imbalance zones, adjusting the range/size of the link imbalance zone, and combinations of the previous two.

In the first case, the network 100 could either increase or decrease the density of protected resources in order to balance the traffic load across macro and picocells. For example, if many UEs are located within the link imbalance zone 148, the network could increase the density of protected resources in order to accommodate more UEs to the picocells and thus off-load the first macro cell.

In the second case, the network 100 could e.g. update the broadcast system information by setting new threshold offsets that either shrink or expand the range of the link imbalance zones. In situations with most UEs being located in the proximity of pico eNBs and the first macro cell being lightly loaded with respect to the picocells, the network could increase the density of protected resources and shrink the range of the link imbalance zone for idle mode UEs.

Frequent updates of broadcasted system information are not desirable so adjustments of the range of the link imbalance zone would be semi-static.

SUMMARY

The current tools in LTE for steering idle mode UEs to certain cells are not designed to handle traffic load balancing in heterogeneous deployments with small cells covering traffic hotspots. For example, when an idle mode UE within the link imbalance zone is in the process of connecting to a loaded picocell, there are no mechanisms for redirecting the UE to a less loaded macro cell before the connection completes. In UTRAN one mechanism does exist, but it is not efficient in this scenario. When an idle mode UE performs a random access, an eNB may not be able to detect whether the UE is accessing from the link imbalance zone or not. Hence, the first random access response from the eNB needs to be scheduled in protected subframes, i.e., in a subset of downlink subframes. However, UEs close to the eNB may be scheduled in any subframe, so the eNB would then not need to restrict the scheduling to protected subframes for such UEs. A mechanism that may provide the eNB with an early indication of the downlink radio reception condition could improve the scheduling flexibility of the eNB.

One or more non-limiting embodiments of the present invention address some or all of the problems described above. One or more inventive embodiments provide mechanisms for redirecting UEs camping within the link imbalance zone to neighbor cell(s) before connection establishment has been completed. The redirection message may be conveyed to the connecting UE, for example in a random access response. The UE indicates, implicitly or explicitly (e.g., in a random access message, or via RA preamble sequence selection), that it is accessing the cell from the link imbalance zone. One embodiment provides, in a UE for use in a cellular communication network having a first cell and a second cell, a method for performing an access request by the UE for operatively connecting the UE to the first cell. The method includes the steps of obtaining at least one first quality parameter indicating quality of radio reception between the UE and the first cell and at least one second quality parameter indicating quality of radio reception between the UE and the second cell. Based on the obtained quality parameters, it is determined whether the UE has an option to be connected to both the first cell and the second cell. When the UE has the option to be connected to both the first cell and the second cell, access request information is sent to the first cell, including redirect option information indicating availability of the UE to be redirected for connection to the second cell.

An advantage of this embodiment is that an option is provided to handle link imbalance issues while an access request is performed. This is because already during the access request, the UE indicates that an option is available to be redirected for connection to the second cell. The option for redirection is indicated by means of the redirect option information. Availability of this indication allows the first cell to redirect the UE to the second cell while handling the access request. This allows quicker and more efficient redirection than in a case where first a full access request is handled and completed and subsequently the handover of the UE to the second cell is handled in a separate procedure. So a mechanism is provided for a UE camping within the link imbalance zone to be redirected to neighbor cell(s) before connection establishment has been completed. In this way, the number of handovers in networks is reduced and with that, use of network resources is reduced.

This method may be employed in heterogeneous networks as already discussed, but also in link imbalance areas shared by two or more macro cells.

Optionally, in the method of the first embodiment, the redirect option information comprises an identifier identifying the at least second cell.

An advantage of this option is that the first cell is directly aware of the actual option for redirecting the UE, so the second cell may be identified. This enables the first cell to also compare its own characteristics to equivalent characteristics of the second cell and base a decision for redirecting on the outcome of the comparing.

In a further option of the method according to the first embodiment, the redirect option information comprises information indicating availability of the option to be connected to the first cell and the second cell, said availability being an outcome of the determining.

An advantage of this option is that such information may be provided in a very efficient way, for example by means of setting a specific single bit to a specific value. In practice, this could means that a value of "1" could indicate that the UE is in a link imbalance zone and a value of "0" could indicate that the UE is not in a link imbalance zone.

In another option of the method according to the first embodiment, the access request information is part of a Random Access Procedure. A Random Access Procedure is a pre-defined procedure in various cellular communication standards. Therefore, making the access request a part of a Random Access Procedure allows relatively simple implementation of the first embodiment discussed above. Furthermore, for implementing this option, only minor modifications are required to upgrade the UE to use this method. Upgraded UEs would still be able to operate in legacy systems.

In a further option of the method according to the first embodiment, the access request information sent to the first cell comprises sending a Random Access Preamble, wherein in the case where, based on the determining, the UE has an option to be connected to both the first cell and the second cell, the Random Access Preamble is selected from a predetermined subset of Random Access Preambles broadcasted by the first cell.

An advantage of this option is that no additional data has to be sent by the UE to the first cell. The redirect option information is sent by selecting a specific Random Access Preamble—and a Random Access Procedure comprises sending a Random Access Preamble in general.

A second embodiment provides, in a first base station serving a first cell for use in a cellular communication network having a first cell and a second cell, a method for handling an access request from a UE for operatively connecting the UE to the first cell. The method includes the steps of receiving redirect option information from the UE indicating availability of the UE to be redirected to a second cell and obtaining first load information indicating a load of the first cell. If the load of the first cell meets pre-defined load criteria, the first base station sends to the UE, information providing a redirecting instruction for instructing the UE to send an access request to the second cell.

This method allows the first base station to perform a form of load balancing. For example, in case the first cell is full, the UE is instructed to connect to the second cell. In another example, the user is equipment is instructed to connect to the second cell if the load on the first cell is 80°, or more.

Optionally, the method according to the second embodiment comprises obtaining second load information indicating a load of the second cell and the redirecting instruction instructs the UE to operatively connect to the cell with the lowest load.

With this option, the base station has more specific capabilities of load balancing. By comparing load information from the first cell and the second cell and instructing the UE to operatively connect to the cell with the lowest load, load may be evenly distributed over both cells.

In another option, the redirect option information may comprise an identifier identifying the second cell and the redirecting instruction specifically instructs the UE to operatively connect to the second cell.

This directly allows the base station to redirect the UE to the second base station, without a need for the UE to further identify the second base station upon receiving a redirection.

A further option of the method according to the second embodiment comprises broadcasting a set of Random Access preambles related to the first cell. In this option, the set of Random Access preambles comprises a first sub-set of Random Access preambles for use by the UE for indicating availability of the UE to be redirected to the second cell; and a second sub-set of Random Access preambles for use by the mobile communication in case the UE does not have an option to be redirected to the second cell.

With this option, UE may indicate already in a first step of a Random Access Procedure that it is located in a link imbalance zone and has an option to connect to both the first and the second cell. This allows the base station to indicate in a first response to the UE that the UE is redirected.

A third embodiment provides a UE for use in a cellular communication network having a first cell and a second cell, the UE includes a sending circuit, a receiving circuit, and a processing circuit. The processing circuit is configured to obtain at least one first quality parameter indicating quality of radio reception between the UE and the first cell and at least one second quality parameter indicating quality of radio reception between the UE and the second cell. The processing circuit is further configured to determine, based on the obtained quality parameters, whether the UE has an option to be connected to both the first cell and the second cell. Upon determining that the UE has an option to be connected to both the first cell and the second cell, the processing circuit instructs the sending circuit to send access request information to the first cell including redirect option information to the first cell indicating availability of the UE to be redirected for connection to the second cell.

For the third embodiment, options are applicable that are equivalent to those of the first embodiment.

A fourth embodiment provides a first base station serving a first cell for use in a cellular communication network having a first cell and a second cell. The first base station includes a sending circuit, a receiving circuit, and a processing circuit. The processing circuit is configured to receive, via the receiving circuit, redirect option information from the UE indicating availability of the UE to be redirected to a second cell, and to obtain first load information indicating the load of the first cell. When the load of the first cell meets pre-defined load criteria, the processing unit is configured to instruct the sending circuit to send to the UE, information providing a redirecting instruction for instructing the UE to send an access request to a the second cell.

For the fourth embodiment, options are applicable that are equivalent to those of the second embodiment.

Optionally, the first base station of the fourth embodiment is also arranged for serving the second cell.

DETAILED DESCRIPTION

Although terminologies from 3GPP are used in this disclosure for explanation purposes, this should not be seen as limiting the scope of the disclosed subject matter to only the aforementioned system. Other wireless systems, including WCDMA, WiMax, UMB, GSM and others may benefit from exploiting the ideas covered within this disclosure.

Figure 4:
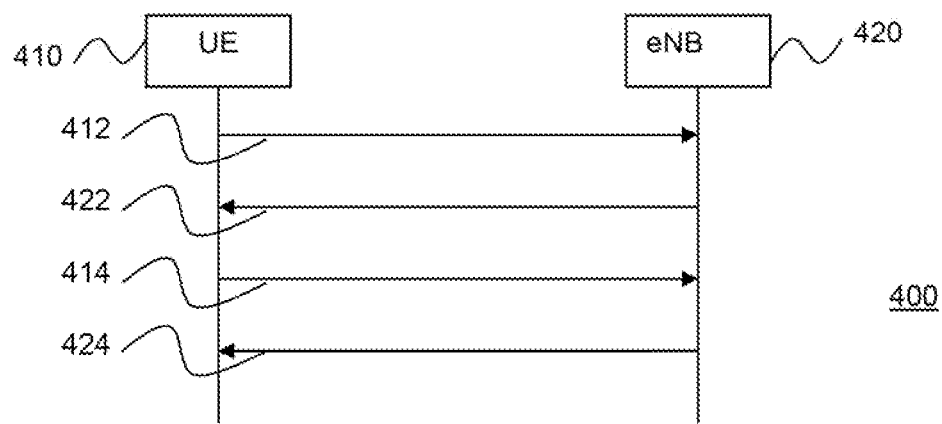
FIG. 4 shows a protocol diagram of an existing contention based random-access procedure.

FIG. 4 shows a protocol diagram of an existing contention based random-access procedure between a User Equipment (UE) 410 and an eNB 420, also known as an Evolved Node B. In a first communication message 412 (in this disclosure also referred to as msg1), the UE 410 transmits a randomly selected preamble (from a set of 64 defined cell specific preamble sequences) in resources indicated in broadcast system information. In a second communication 422 (in this disclosure also referred to as msg2), the eNB 420 detects the preamble and sends a random access response conveying information required for the UE to start communicating with the eNB. In a third communication 414, the UE 410 transmits in granted resources, a random access message (also in this disclosure referred to as msg3) conveying its identity and an RRC connection request. In a fourth communication message 424, the eNB 420 transmits a contention resolution message in order to resolve potential random access collisions among UEs (in this disclosure also referred to as msg4).

Figure 1:
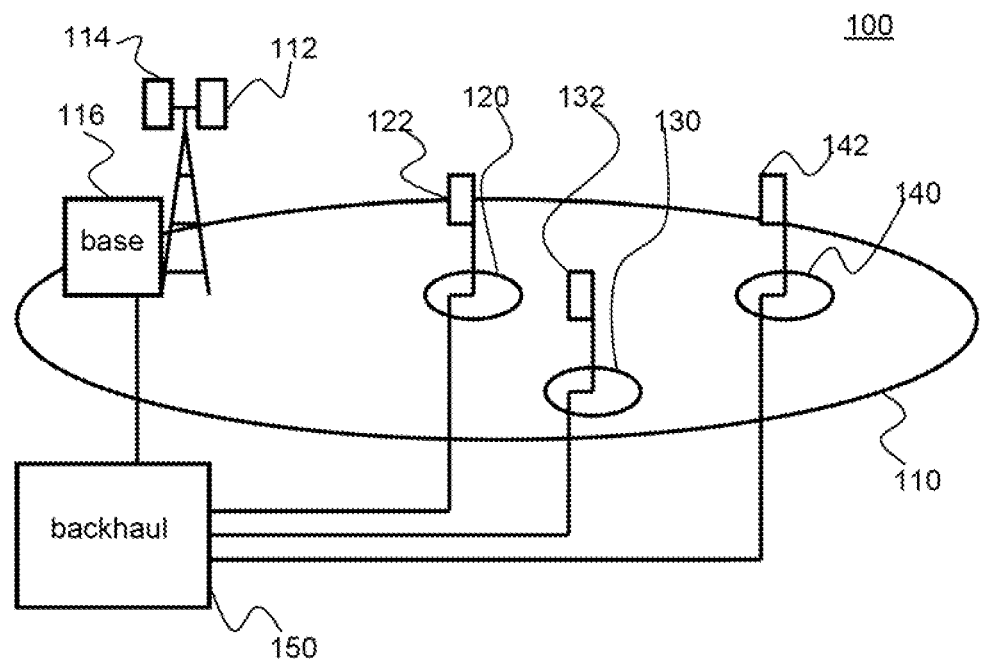
FIG. 1 shows a schematic representation of a network environment.
Figure 2:
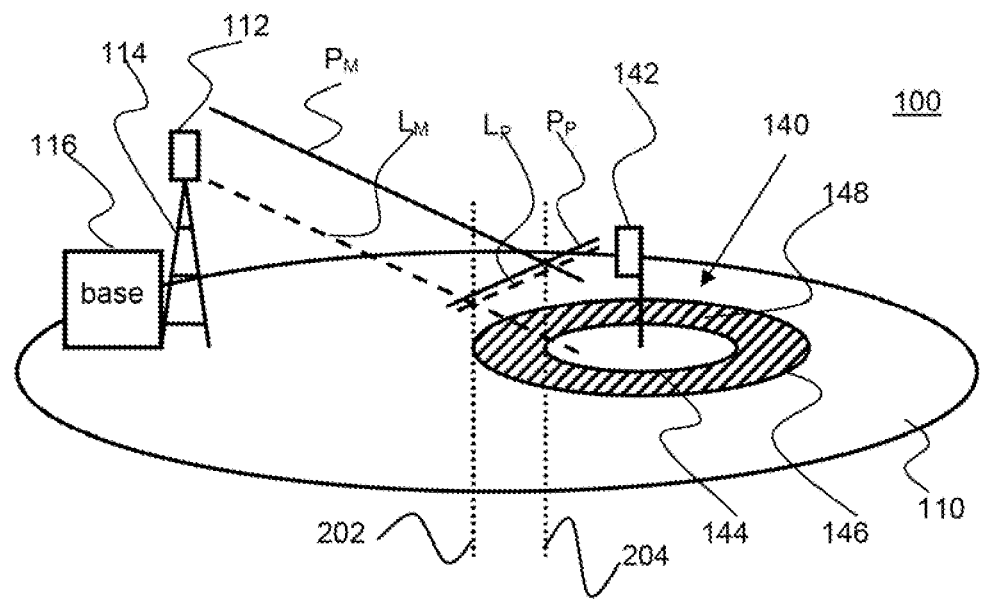
FIG. 2 shows the schematic representation of the network environment and graphical representations of various parameters.

In accordance with the first embodiment, in case the outcome of the determining is that the UE has an option to be connected to both the first cell and the second cell, sending access request information to the first cell including redirect option information indicating availability of the UE to be redirected for connection to the second cell. The redirect option information may be communicated in various ways. Referring to FIG. 1 and FIG. 2, in case the UE detects a link imbalance situation, it notifies the third picocell 142 that this is the case. This means that the UE also has an option to connect to the first macro cell 112, in accordance with a definition of link imbalance.

Figure 5:
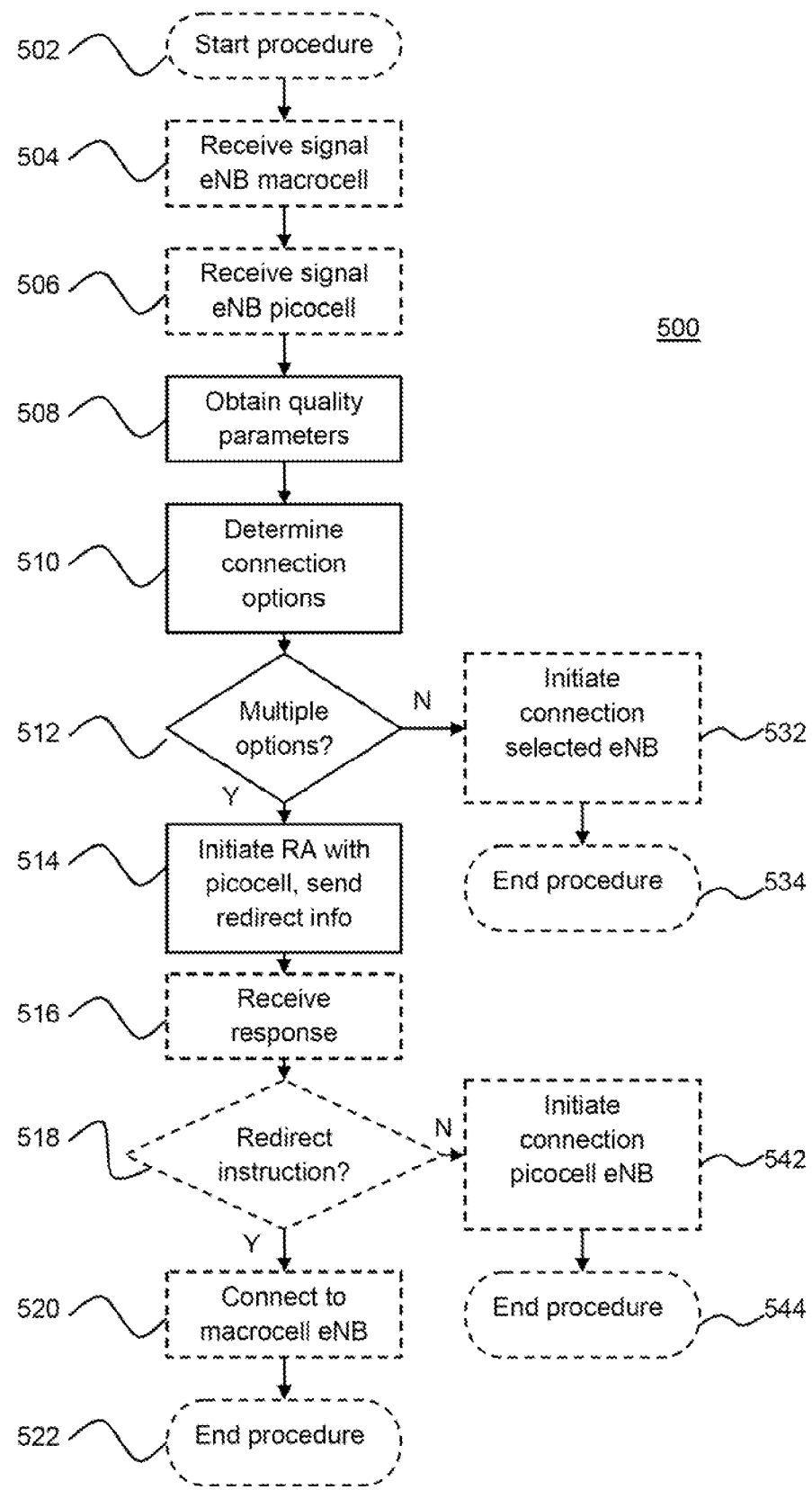
FIG. 5 shows a first flowchart illustrating the steps of an exemplary embodiment of the method of the present invention.

FIG. 5 shows a first flowchart illustrating the steps of an exemplary embodiment of the method of the present invention. FIG. 5 depicts a first method for performing an access request by a cellular telephone or other UE. Subsequently, options for further implementation are discussed.

The first method starts in a starting point 502 and proceeds with receiving a signal from the eNB of the macro cell 112 (FIG. 1) in step 504 and a signal from the eNB of the picocell 142 (FIG. 2) in step 506. Alternatively, signals are received from two macro cell eNBs; this disclosure is not limited to connecting to either a picocell or macro cell only. The step 504 and the step 506 may be executed in random order or simultaneously. Subsequently, quality parameters are obtained from the received signals indicating quality of radio reception between the UE and each of the cells in step 508, for example by measuring signal strength or other signal parameters, either analogue, digital or both. The quality parameters are for example Reference Signal Received Power (RSRP), Reference Signal Received Quality (RSRQ) or both. Alternatively or additionally, also other quality parameters are obtained. Subsequently, based on the obtained parameters, in step 510, options for connecting to the first macro cell 112, the third picocell 142 or both, are determined. As will be apparent from other parts in this disclosure, the UE will have an option to connect to both cells in case it is located in the link imbalance zone 148 (FIG. 2).

Whether the UE only has an option to connect to the first macro cell 112 and the third picocell 142—or more cells than that in applicable cases—is determined in a decision 512. If the UE has indeed an option to connect to multiple cells, it initiates a Random Access procedure with the third picocell 142 in step 514. In the Random Access procedure, the UE sends redirect option information indicating availability of the UE to be redirected for connection to the macro cell 112. Further options on how this information is sent will be discussed below.

In case the outcome of the decision 512 is that the UE has only a single option for a cell or eNB to connect to, the UE initiates a connecting by sending an access request to that single cell in step 532. The access request sent in this particular case does not include redirect option information. Subsequently, the procedure ends in a terminator 534.

Figure 6:
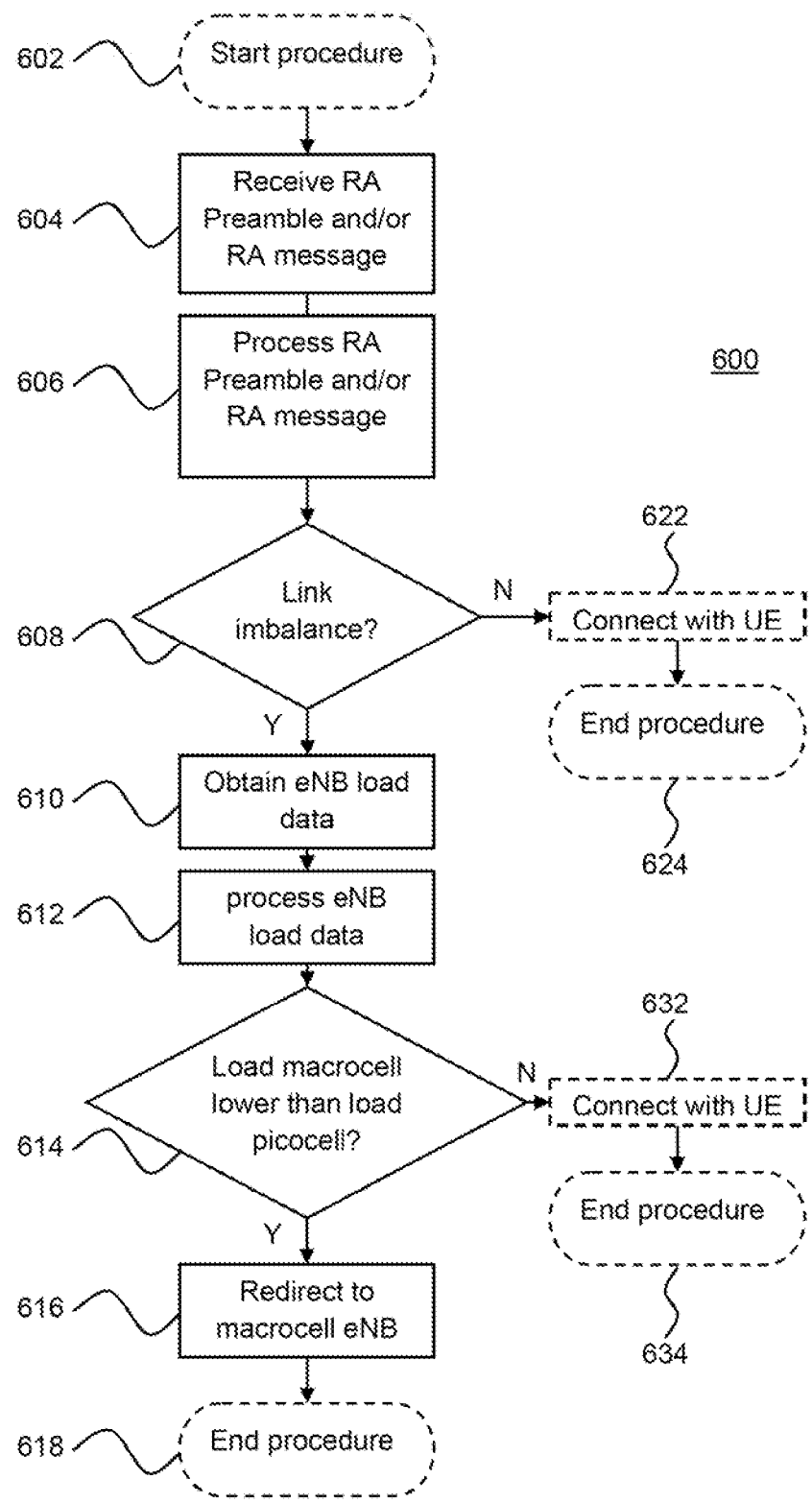
FIG. 6 shows a second flowchart illustrating the steps of another exemplary embodiment of the method of the present invention.

FIG. 6 shows a second flowchart illustrating the steps of another exemplary embodiment of the method of the present invention. Flowchart 600 depicts a second method of handling the access request from the UE, as performed by a base station serving a cell for which access is requested. Following the access request sent by the UE in accordance with FIG. 5 in step 514 or step 532, the second method of handling such access request from UE by a base station serving a cell for which access is requested begins with starting point 602. A message of the Random Access procedure is received in a step 604. Subsequently, the Random Access Preamble or the Random Access message will be processed to check for redirect option information indicating availability of the UE to be redirected for connection to another cell in a step 606. Referring to FIG. 4, the first communication message 412 and the third communication message 414 are check for redirect option information. This will be discussed in further detail below.

In case no redirect option information indicating availability of the UE to be redirected for connection to another cell is found, the base station serving the cell to which the access request was sent accepts in step 622 the access request of the UE, provided the cell to which the access request was sent is not full. Subsequently, the procedure ends in a terminator 624.

In case redirect option information indicating availability of the UE to be redirected for connection to another cell is found, eNB load data of the cell is obtained in step 610. In particular in this example, this is the load also performing this second method as depicted by the second flowchart 600, which is in this example the third picocell 142 (FIG. 1, FIG. 2). Optionally, also the load of another eNB or cell, in this example the macro cell 112, is obtained as well in the step 610.

Subsequently, the obtained load data is processed in step 612. The processing done may be comparing the load of the macro cell 112 to the load of the picocell 142. Alternatively or additionally, the load of the third picocell 142 is compared to a pre-determined threshold for which data is stored in the third picocell 142. In the particular example discussed here, the load of the third picocell 142 is compared to the load of the macro cell 112. The outcome of this comparison is checked in a decision 614. In case the load of the macro cell 112 is higher than that of the third picocell 142, the picocell 142 accepts the access request from the UE in step 632 and the procedure ends in the terminator 634.

In case the load of the macro cell 112 is lower than that of the third picocell 142, a message is sent to the UE in step 616, redirecting the UE for connection to the macro cell 112. Referring to FIG. 4, the message for redirecting is sent by means of the second communication message 422 or the fourth communication message 424. This will be discussed in further detail below. Subsequently, the procedure ends in a terminator 618.

Referring again to FIG. 5, any message from the picocell 142 is received back and processed by the UE in step 516 and in decision 518 is checked whether a redirect instruction has been received from the picocell 142—which would have been sent out in step 616. If such redirect instruction has not been received, the UE connects to the picocell eNB in step 542 and the procedure ends in terminator 544. In case an instruction for redirection has been sent by the picocell 142 in step 616 and it has been received by the UE in step 514, it is decided in decision 518 that the UE connects to the macro cell 112 in step 520. Subsequently, the procedure ends in terminator 522. Below, four examples will be discussed, either with or without further options for implementation of the examples.

A first embodiment of a procedure to redirect an access by a UE in idle mode is based on the protocol depicted by FIG. 4. In the first embodiment, the UE includes in msg3 an information element comprising of a list of candidate neighbor cells ranked in accordance with their radio reception quality. The list may be a list of Physical Cell Identities (PCI) of the candidate cells. Cells with quality below a threshold need not be included in the candidate list.

In the first communication message 412, the UE 410 transmits a Random Access Preamble. In the second communication 422, the eNB 420 detects the preamble and sends a random access response conveying information required for the UE to start communicate with the eNB. In the third communication 414, the UE 410 transmits in granted resources a random access message (msg3) conveying its identity and an RRC connection request. Furthermore a PIC candidate list will be sent as discussed below. In the fourth communication message 424, the eNB 420 transmits a contention resolution message in order to resolve potential random access collisions among UEs (msg4)

In one embodiment, the candidate list may be included when the UE detects that it is located in the link imbalance zone. Depending on the load situation in the accessed cell, the eNB may echo in msg4 one of the PCI's to indicate redirection to a cell with lower load. Here, it is assumed that (loaded) eNBs regularly exchange load information with neighbor cells (e.g., via the X2 interface, if cells are managed by separate eNBs). Among the listed PCI's, the eNB may select a cell for redirection based on a function of ranked radio reception quality and associated load information provided via the backhaul.

In another embodiment, the eNB may judge, at least to some extent, whether the UE data volume justifies a change of cell. The UE may select a RA pre-amble group depending on the data volume it intends to send (e.g., an amount of data it has in the buffer). RA pre-amble group may be divided into groups multiple groups such as groups A and B, depending on the prepared uplink message size (current threshold 56, 144, 208 or 256 bits).

Presence of the candidate list in the random access message (msg3) indicates that the UE supports redirection in step 4. It also indicates that the UE is accessing the cell from the link imbalance zone. Recall from FIG. 2 that a UE camping on a picocell has negative geometry when it is within the link imbalance zone, i.e. the received power (RSRP) is stronger from a neighbor macro cell. To ensure that UEs with very low geometries may detect eNB transmissions, the RA responses are preferably scheduled in the protected subframes. A UE that does not include the PCI candidate list in the random access message should be able to detect the "Contention Resolution" message in any downlink subframe.

This embodiment has some similarities with UTRAN "RRC Connection Rejection with Redirection Information". In UTRAN the UE may include Measured results on RACH in a message similar to the Random Access message above. However, indication of 'link imbalance zone', does not exist in UTRAN. So if a UE only includes Measured results on RACH when in a 'link imbalance zone' the RACH procedure for UTRAN would be improved.

Cells compatible with the UE capabilities are the valid targets. The proposed method is that the UE reads system information and preferably only includes appropriate cells that the UE may use in Measured results on RACH information element together with 'link imbalance zone' indication.

The eNB in the first embodiment may be any eNB. The eNB transmissions in the system is assumed to be coordinated such that radio conditions do not prevent link imbalance operation capable UEs to be associated to either the high power or the low power node. Whether an idle mode UE camps on the macro or the picocell when it is within the link imbalance zone would depend on the cell reselection thresholds configured by the network. The threshold settings are coordinated across the cells to avoid conflicts in the cell reselection behavior. Thus, the first embodiment redirection is valid either from a picocell to macro cell or vice versa.

As an alternative, if the accessed eNB is a picocell, the eNB may indicate a redirection to the macro cell (e.g., using a single bit indicator) in msg4 without having to indicate the full PCI to the UE.

The second embodiment may be viewed as a special case of the first embodiment. In this embodiment, the UE includes only the PCI of the strongest neighbor cell in the random access message (msg3).

Depending on the load situation in the accessed cell, the eNB may echo in msg4 the PCI to indicate redirection. As in the first embodiment, the UE implicitly indicates cell access from the link imbalance zone with the presence of the neighbor PCI information. Also like the first embodiment, the eNB may be any eNB. Again as an alternative, accessed pico eNB may indicate a simple redirect to the macro cell.

A message coding optimized version is the following. Network broadcasts list of neighbors (PCIs) up to a predetermine maximum, e.g., 32. UE includes an index to best candidate (e.g., 5 bits).

In the third embodiment, the UE explicitly indicates in msg3 that it is in the link imbalance zone. For example, msg3 may include an information element comprising of a bit indicating cell access from the link imbalance zone. Detection of being in the imbalance zone is done in the same way as described above: comparison of RSRP and path loss to different cells or neighbour cell(s) are within 'offset' from being the best candidate). Detection could also be based on when the quality of a neighbour exceeds a quality threshold, but this is less reliable than the previous alternatives.

Depending on the load situation in the accessed picocell, the pico eNB may echo in msg4 a bit to (implicitly) indicate redirection to the macro cell. This approach could e.g. be considered when low power nodes are deployed well inside the macro cell coverage, i.e. when one macro cell dominates the interference towards the link imbalance zone.

Message 3 (RRCConnectionRequest) is currently highly optimized and has a length of 80 bits. It is desired to keep this message as short as possible in order to keep latency low and coverage high. The minimum extension is 8 bits, since the messages are octet aligned. Some options are:

1. Include "single bit" to indicate "more info to follow in next message". Adds latency, but only when needed, since the extension may be selectively used only when other cells exceed some threshold. Since full MAC flexibility is probably not needed for these early messages, a bit may be borrowed from a MAC header.
2. Broadcast in relevant cells, for example indicate that "initial grant is 108 bits, include measurements". In this instance new, extended message may be used. In other cells legacy procedure may be used. The longer message 3 is suitable for small cell environment, where there is lower path loss.
3. UE includes flag indicating "other cells (possibly limited to be within network-signaled range)" exceed the quality threshold compared to current cell. Network may then indicate "leave" or "stay".
4. Network broadcasts list of neighbors (PCIs) up to a predetermine maximum, e.g., 32. UE includes an index to best candidate (e.g., 5 bits). This is one form of optimized encoding. Network may then compare load of potential target. This option is preferably used in the absence of PCI confusion.

As an alternative a simple redirection indicator in msg4, the PCI may be explicitly indicated. The PCI may be the PCI of the macro cell or any of the picocells.

In the fourth embodiment, a UE conducting a picocell access from the link imbalance zone selects (in step 1) one preamble from a predetermined set (e.g., second set) of cell-specific RA preamble sequences. By transmitting a sequence from the second set of preamble sequences, the UE thus implicitly indicates link imbalance zone operations.

Depending on the load situation in the accessed picocell, the pico eNB may echo in its first RA response (step 2) a bit to indicate redirection to the macro cell. This response is sent in a protected subframe in order to ensure that a UE operating in the link imbalance zone may detect the response.

A UE within the RSRP border (see FIG. 2) selects in step 1 a preamble from another set (e.g., a first set) of cell-specific RA preamble sequences, and then follow the RA procedure illustrated in FIG. 4. As a UE within the RSRP border has good downlink radio conditions, the pico eNB may send the RA responses in any subframe. As an alternative, the first RA response in step 2 may explicitly indicate the selected PCI.

UE and eNB are described in the above method embodiments However, these are merely examples of nodes that may implement the described embodiments. UE is an example of a mobile node and eNB is an example of a network node.

Figure 7:
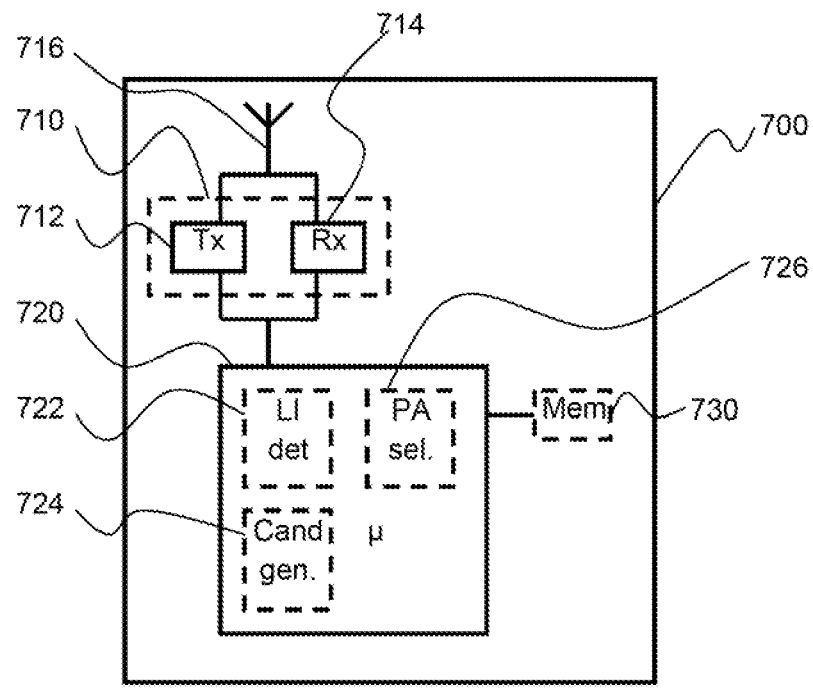
FIG. 7 shows a block diagram of an exemplary mobile node of the present invention.

FIG. 7 shows a block diagram of an exemplary mobile node 700 such as a UE in accordance with the present invention. As seen, the mobile node 700 may include a communication unit 710 comprising a transmitting circuit 712 and a receiving circuit 714, a link imbalance zone detecting unit 722, a candidate list generating unit 724, and a preamble selecting unit 726. The communication unit 710 is connected to an antenna 716. The communication unit 710 is arranged to communicate with other nodes such as a network node. In particular, the communication unit 710 may be arranged to send and receive random access messages with the network node. The link imbalance zone detecting unit 722 is arranged to determine whether or not the mobile node is in a link imbalance zone, for example as discussed above. The preamble selecting unit 726 is arranged to select a preamble from one or more sets of preamble sequences. For example, the preamble may be selected based on a data volume the mobile node intends to send and/or may be selected based whether the mobile node is in the link imbalance zone. The candidate list generating unit 724 is arranged to generate a list of candidate cells, e.g., a list of PCIs, for connection. The number of candidates may be as few as one (e.g., for strongest candidate).

FIG. 7 provides a logical view of the mobile node and the units included therein. It is not strictly necessary that each unit be implemented as physically separate modules. Some or all units may be combined in a physical module. Also, the units need not be implemented strictly in hardware. It is envisioned that the units may be implemented through a combination of hardware and software. For example, the mobile node may include a central processing unit 720 or multiple central processing units executing program instructions stored in a non-transitory storage medium 730 or in firmware of the central processing unit 720 to perform the functions of the units.

Figure 3:
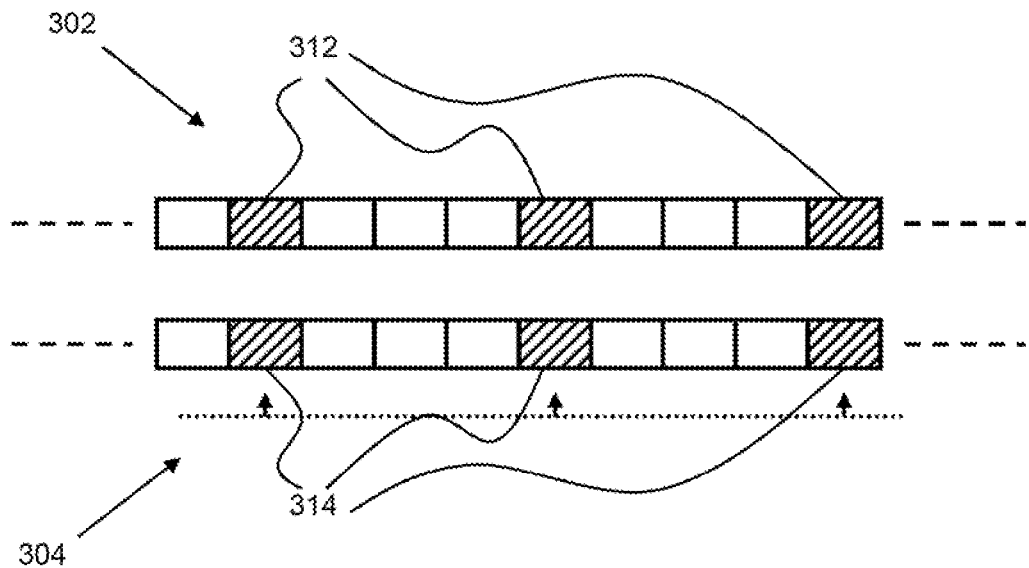
FIG. 3 shows schematic representations of two communication channels.
Figure 8:
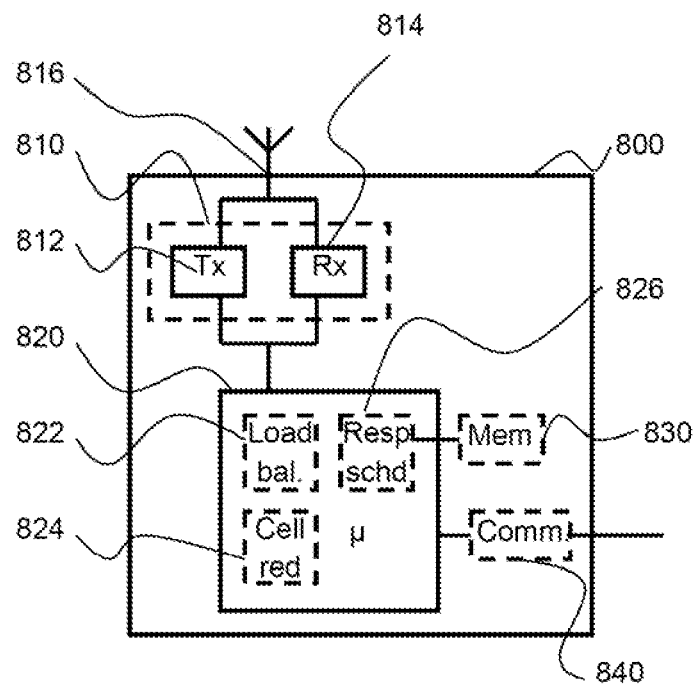
FIG. 8 shows a block diagram of an exemplary base station of the present invention.

FIG. 8 shows a block diagram of an exemplary network node (800) of the present invention. As seen, the network node 800, which may be a base station or eNB, may include a communication unit 810 comprising a transmitting circuit 812 and a receiving circuit 814, load balancing unit 822, response scheduling unit 826, and a cell redirecting unit 824. The communication unit 810 is connected to an antenna 816. The communication unit 810 is arranged to communicate with other network nodes, for backhaul communication, and to communicate with mobile nodes. Alternatively, backhaul communication is conducted by means of a backhaul communication circuit 840. The load balancing unit 822 is arranged to determine balancing of loads of cells including macro, femto, and picocells. The response scheduling unit 826 is arranged to schedule responses to random access messages from the UE. Depending on the circumstances, the response scheduling 826 unit may schedule the responses to be sent on any subframe or in protected subframes of an eNB as discussed in conjunction with FIG. 3 and in other parts of this disclosure. The cell redirecting unit 824 is arranged to determine to which cell a connecting UE should be redirected to for connection to the network.

FIG. 8 also provides a logical view of the network node and the units included therein. It is not strictly necessary that each unit be implemented as physically separate modules. Some or all units may be combined in a physical module. Also, the units need not be implemented strictly in hardware. It is envisioned that the units may be implemented through a combination of hardware and software. For example, the network node may include one or more central processing units executing program instructions stored in a non-transitory storage medium or in firmware to perform the functions of the units.

The network node 800 may be implemented as several physical units. Example: Radio Unit for Tx/Rx, Baseband unit for most logic and a central coordinator for load balancing. The Fig. does not restrict implementation. Optional steps provided in the drawings are alternative further embodiments to the one mainly disclosed.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, it should be noted that disclosed subject matter is not limited to the embodiments and alternative described above. The invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention. It is stipulated that the reference signs in the claims do not limit the scope of the claims, but are merely inserted to enhance the legibility of the claims.

The invention claimed is:

1. In a User Equipment for use in a cellular communication network having a first cell and a second cell, a method for performing an access request by the User Equipment for operatively connecting the User Equipment to the second cell, wherein the method is performed while the User Equipment is in Idle mode, the method comprising:
   obtaining at least one first quality parameter ($L_P$, $P_P$) indicating quality of radio reception between the User Equipment and the first cell;
   obtaining at least one second quality parameter ($P_M$, $L_M$) indicating quality of radio reception between the User Equipment and the second cell;
   determining, based on the obtained at least first quality parameter ($L_P$, $P_P$) and the obtained at least second quality parameter ($P_M$, $L_M$), whether the User Equipment has an option to be connected to both the first cell and the second cell; and
   upon determining that the User Equipment has an option to be connected to both the first cell and the second cell, implicitly indicating in a Random Access Preamble that the User Equipment is available to be redirected for connection to the second cell, wherein implicitly indicating comprises:
      selecting a Random Access Preamble from a pre-determined subset of Random Access Preambles designated for use when the UE is available to be redirected to the second cell; and
      transmitting the selected Random Access Preamble.

2. The method according to claim 1, further comprising:
   receiving an uplink grant from the first cell;
   transmitting an access request to the first cell; and
   receiving from the first cell, an instruction for the User Equipment to connect to the second cell.

3. The method according to claim 2, further comprising sending an access request to the second cell in response to receiving from the first cell, the instruction to connect to the second cell.

4. The method according to claim 1, wherein the pre-determined subset of Random Access Preambles is broadcasted by the first cell.

5. The method according to claim 1, wherein the determining step comprises observing the at least first quality parameter and the at least second quality parameter, wherein the UE implicitly indicates in the Random Access Preamble that the User Equipment is available to be redirected for connection to the second cell when the second quality parameter indicates better radio reception quality of the second cell than of the first cell.

6. A User Equipment for use in a cellular communication network having a first cell and a second cell, the User Equipment comprising:
   a sending circuit;
   a receiving circuit; and
   a processing circuit;
   wherein while the User Equipment is in Idle mode, the processing circuit is configured to:
   obtain through the receiving circuit, at least one first quality parameter ($L_P$, $P_P$) indicating quality of radio reception between the user equipment and the first cell;
   obtain through the receiving circuit, at least one second quality parameter ($P_M$, $L_M$) indicating quality of radio reception between the User Equipment and the second cell;
   determine, based on the obtained at least first quality parameter ($L_P$, $P_P$) and the obtained at least second quality parameter ($P_M$, $L_M$), whether the User Equipment has an option to be connected to both the first cell and the second cell;

when the User Equipment has an option to be connected to both the first cell and the second cell:

select a Random Access Preamble from a pre-determined subset of Random Access Preambles designated for use when the UE is available to be redirected to the second cell; and instruct the sending circuit to send the selected Random Access Preamble to the first cell, the Random Access Preamble implicitly indicating that the User Equipment is available to be redirected for connection to the second cell.

7. The User Equipment according to claim 6, wherein the processing circuit is further configured to observe the at least first quality parameter and the at least second quality parameter and to select the Random Access Preamble implicitly indicating that the User Equipment is available to be redirected for connection to the second cell when the second quality parameter indicates better communication radio reception quality with the second cell than with the first cell.

8. The User Equipment according to claim 6, wherein the processing circuit comprises a link imbalance zone detecting unit configured to determine whether the User Equipment has an option to be connected to both the first cell and the second cell.

9. The User Equipment according to claim 6, wherein the receiving circuit receives the pre-determined subset of Random Access Preambles from the first cell.

* * * * *